Patented Apr. 4, 1944

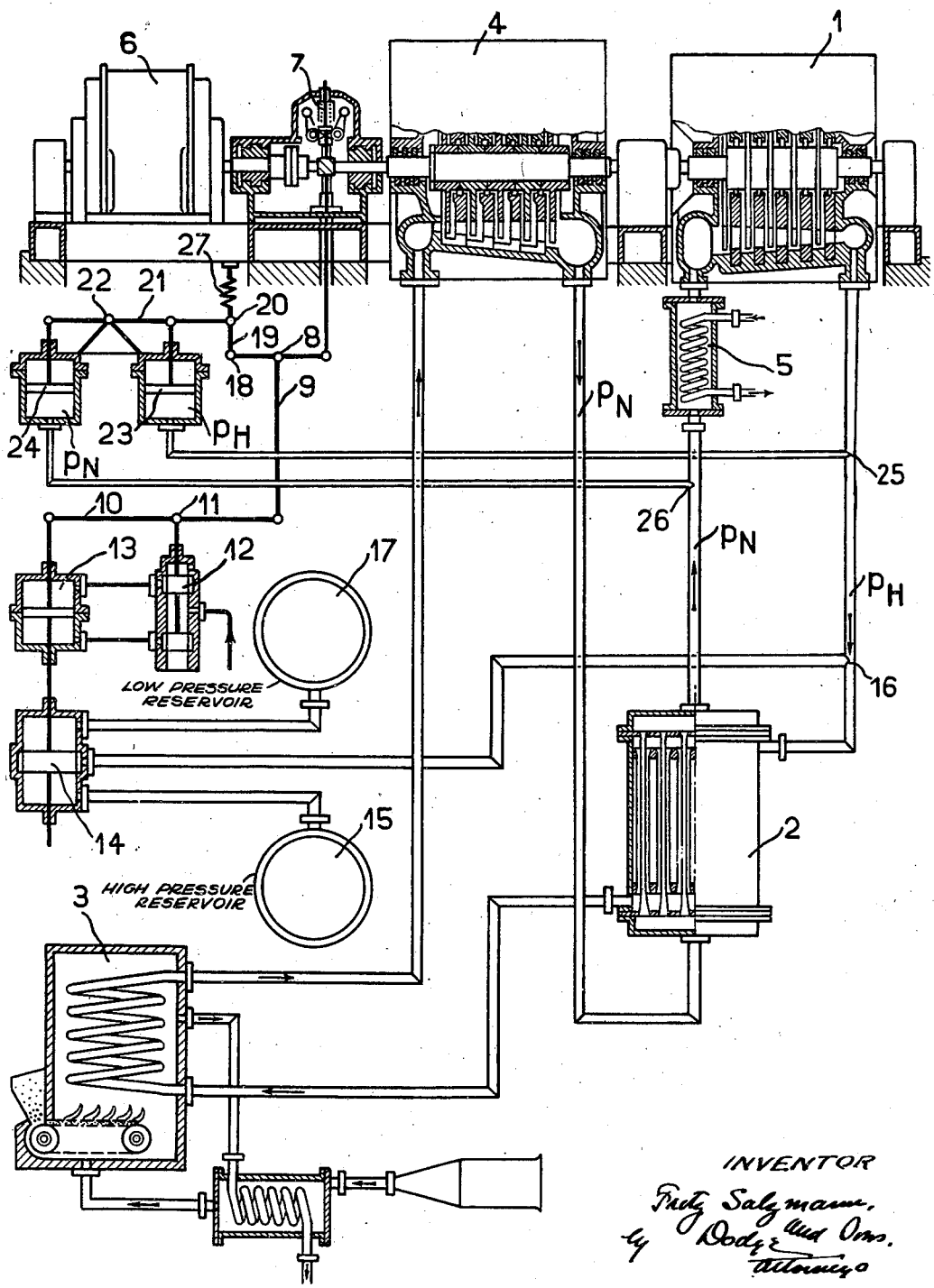

2,345,950

UNITED STATES PATENT OFFICE 2,345,950

THERMAL POWER PLANT

Fritz Salzmann, Zurich, Switzerland, assignor to Aktiengesellschaft fuer Technische Studien, Zurich, Switzerland, a corporation of Switzerland Application July 19, 1943, Serial No. 495,345
In Switzerland May 9, 1942

3 Claims. (Cl. 60—59)

This invention relates to thermal power plants in which at least the greater part of a gaseous working medium, preferably air, describes a closed circuit at a pressure above atmospheric, the working medium which is heated by a supply of heat from an external source being expanded in at least one turbine giving up its output externally and thereafter being again brought to a higher pressure in at least one compressor. It has already been proposed to provide in such power plants means controlled automatically in dependency on the load on the plant and which, when a change in load takes place, permit working medium being supplied to or withdrawn from the circuit at a point where a high pressure prevails.

Changes in load can in such plants also be brought about by altering the absolute pressure in the circuit or the weight of the working medium flowing in the circuit. Any change in the pressure condition then involves at every point of the circuit, compared with the originally prevailing condition, a change in pressure of the same ratio. The pressure at every point of the circuit is always substantially proportional to the output produced by the plant.

A fixed relationship between output and speed of the plant can be ensured, as is already known, if the means influenced by the speed and serving for supplying and withdrawing working medium to or from the circuit are controlled by the pressure prevailing at a given point of the circuit. In this way rapid action of the regulating operation can be brought about if the supply and withdrawal of working medium are effected at a point of the circuit where a high pressure prevails.

If this is the case, then, for example when working medium is supplied to the circuit, the pressure head in the plant is immediately increased so that the output of the turbine is, as required, quickly increased. The ratio between maximum and minimum pressure in the plant is consequently temporarily increased and only gradually returns to the normal value when the plant is left to itself, i. e. after the supply of working medium has been terminated.

Consequently when supplying working medium to the circuit the pressure before the turbine will at first change to a greater extent than the back pressure of the turbine, since the latter does not commence rising until a certain surplus of working medium, compared with the volume dealt with by the compressor, has gained access to that part of the circuit situated between turbine discharge and compressor inlet.

The present invention depends on this fact in that it makes use of the same to maintain the speed governing of the plant as stable as possible, i. e. to ensure that fluctuations of speed which set in owing to a change in output are caused to die out as quickly as possible.

A known measure for improving stability of regulation is to utilize the action brought about by the regulating operation for temporarily restoring the control gear to a greater extent than the condition prevailing after completion of the regulating operation would require. In this connection one speaks of a so called "accelerated" restoring action. According to the present invention such an "acceleration" of the restoring movement is brought about in that the restoring movement of the automatically governed means for regulating the supply and withdrawal of working medium to and from the circuit is effected in dependency on the variation of the highest pressure prevailing within the circuit and under the counter action caused by the variation of the lowest pressure occurring within the circuit.

A preferred embodiment of the invention is illustrated by way of example and in a simplified mode of representation on the accompanying drawing.

In the thermal power plant illustrated the working medium used in carrying out the cycle flows, in a manner known per se, through a compressor 1, a heat exchanger 2, a heater 3, a turbine 4, then again through the heat exchanger 2, and afterwards through a cooler 5, whence it passes again to the compressor 1. As consumer of useful output a generator 6, driven by turbine 4, is provided, a centrifugal governor 7 being operatively connected to the shaft of the latter. When changes in speed occur this centrifugal governor 7 initiates movements ending in a supply of working medium to the circuit or a withdrawal of working medium from said circuit. To this end the governor 7 is operatively connected by a beam 8, a rod 9, and a lever 10 to a slide valve 12 linked to the latter at point 11. This valve 12 controls the supply of a pressure medium to an auxiliary servomotor 13, the movements of which operate a slide valve 14 which, when being displaced from its center position, either allows working medium to flow from a high pressure storage reservoir 15 into the circuit at point 16, or permits working medium withdrawn from the circuit at said point 16 to pass into a low pressure storage reservoir 17. The point 16 at which working medium is supplied to or withdrawn from the circuit and which lies between the discharge end of compressor 1 and the inlet end of turbine 4 is consequently disposed at a point of the circuit where the working medium has a high pressure ($p_H$).

To the left hand end 18 of beam 8 a rod 19 is articulated, which is connected at its other end 20 to a beam 21 adapted to oscillate about a point 22. To the beam 21 two pistons 23 and 24 are further articulated, the lower surfaces of which are subjected to the pressures $p_H$ and $p_N$ respectively, the pressures $p_H$ being transmitted from a point 25 of the circuit where a high-pressure prevails and the pressure $p_N$ from point 26 of said circuit where a low pressure exists. At the joint 20 the beam 21 is further subject to the action of a spring 27.

The regulating arrangement of the described thermal power plant works in the following manner:

If for example the power consumption of the generator 6 increases, the result is a decrease in speed of the set 1, 4, 6, so that the lever 8 is turned in a clockwise direction about the point 18, which for the time being is still stationary. The result of this is that the slide valve 12 moves downwards whilst the piston of the auxiliary servomotor 13 moves upwards and together therewith also valve 14, which now allows working medium to flow from the high pressure storage reservoir 15 to the point 16 of the circuit. The first result hereof is that the pressure $p_H$ in this part of the circuit increases. This rise in pressure is transmitted through the pipe branching off from the circuit at point 25 to the lower surface of piston 23 and causes the beam 21 to turn in a counter-clockwise sense and against the action of spring 27. The joint 18 is now raised proportionately to said rise in pressure, so that rod 9 is also raised and the regulating mechanism therefore restored, with the result that the supply of working medium to the circuit at point 16 is again reduced.

As soon as a corresponding portion of the supplied working medium passes, after having given up energy in turbine 4, into the low pressure part of the circuit (which part extends up to the inlet end of the compressor 1), the pressure $p_N$ in this part rises. This rise in pressure is transmitted to piston 24 so that the latter tends to prevent the turning movement of beam 21 brought about by piston 23 as a result of the increase of pressure $p_H$.

The restoring movement of the automatically actuated mechanism regulating the supply of working medium to the circuit therefore takes place in dependency on the variation of the highest pressure $p_H$, occurring in the circuit at any time, and under the counter-action of the variation of the lowest pressure $p_N$ existing within the circuit.

If on the other hand the power consumption of the generator 6 decreases, the result is an increase in speed of the set 1, 4, 6, so that opposite movements of the different parts of the regulating mechanism to those described above take place. The slide valve 14 is now forced downwards thus permitting working medium withdrawn from the circuit at point 16 to flow into the low pressure storage reservoir 17. The result of this is a drop in the pressure $p_H$ so that spring 27 can expand, thereby turning the lever 21 in a clockwise direction. The upward movement of rod 9 brought about by the deflection of the centrifugal governor 7 is therefore again restored. This action brought about by the drop in pressure $p_H$ is again mitigated by the subsequent, retarded lowering of the pressure $p_N$ in the low pressure part of the circuit.

In order to ensure on the completion of a regulating operation in a thermal power plant of the kind herein described, such a coordination between speed and load that a smaller load corresponds to a higher speed and a larger load to a smaller speed, the surfaces of pistons 23 and 24, on which the pressures $p_H$ and $p_N$ respectively act, must be so dimensioned and furthermore the lengths of the lever arms of beam 21 between fulcrum 22 and the point where the rods of pistons 23 and 24 are articulated to said beam 21, must be so chosen that, when the pressures $p_H$ and $p_N$ vary in the same ratio, the influence of the change in $p_H$ as compared with the influence of the change in $p_N$ is always preponderant. When this condition is fulfilled, then in a state of equilibrium, that is to say when the slide valves 12 and 14 are in their midposition, a small load, i. e. a low pressure level, is coordinated to a higher speed and vice versa. If the effects of the pressures $p_H$ and $p_N$ on the restoring movement of the regulating mechanism just balance one another, owing to changes in the same ratio taking place, an isodromic regulation results.

Since in a thermal power plant according to the present invention a change in the pressure $p_N$ occurs with a certain retardation with regard to the change in the pressure $p_H$, a temporary restoring movement is brought about, which exceeds the restoring movement actually required for the final condition, with the result that the stability of the regulation is, as it is well known, favourably influenced. The intentionally excessive restoring movement referred to is again compensated by properties peculiar to the plant itself (the above mentioned retarding action), so that the same characteristics of the regulating arrangement suited to the plant always result, and this quite independently from any changes in the viscosity of a throttled oil current.

The operative characteristics of the preferred embodiment which are above stated in considerable detail can be summarized in the following terms. With the right hand end of the lever 18 in the position shown in the drawing valve 12 can lap only when valve 14 laps. If the right hand end of lever 10 be raised or lowered the valve 12 will move from its lap position and then be restored to lap position with the valve 14 open in one direction or the other so as to connect either the low pressure reservoir or the high pressure reservoir with the point 16 in the circuit. The resulting changes of pressure in the circuit react first through the piston 23 and then through the piston 24. The first reaction is a neutralizing action with respect to the change produced by the governor. The second partly eliminates that neutralizing effect. When the system is in equilibrium, that is when the load and the output are balanced, the control system will assume the position shown in the drawing. The high pressure piston 23 is the dominant piston as explained and re-zeroes the system so that the plant runs at slightly different speeds for different loads.

What is claimed is:

1. Means for the regulation of the output of thermal power plants, in which at least the greater part of a gaseous working medium describes a circuit, is heated by a supply of heat from an external source, then expanded whilst delivering power and afterwards again brought to a higher pressure, comprising in combination means responsive to load changes and serving according to the direction of load change to withdraw or supply working medium from and to that portion of the circuit at which the pressure is h'gh, whereby a pressure change is first induced in the high pressure part of the circuit and later becomes effective in the low pressure part of the circuit; and means subject to the pressure differential between the said two parts of the circuit and serving in response to the successive pressure changes produced therein by action of the load responsive means to exercise a neutralizing effect on the action of said load responsive means, said neutralizing effect being first intense and then diminishing.

2. Thermal power plant, in which at least the greater part of a gaseous working medium describes a closed circuit, comprising a heater in which said working medium is heated by a supply of heat from an external source, at least one engine in which the heated portion of the working medium is expanded, at least one compressor in which the expanded portion of the working medium is again brought to a higher pressure, means controlled automatically in dependency on the load on the plant, which, on a change in load taking place, permit of working medium being withdrawn from or supplied to the circuit, and means for imparting to said automatically controlled means a restoring movement in dependency on the change in the highest pressure occurring in the circuit and under the counter action of the change in the lowest pressure existing within the circuit.

3. Thermal power plant, in which at least the greater part of a gaseous working medium describes a closed circuit, comprising a heater in which said working medium is heated by a supply of heat from an external source, at least one turbine in which the heated portion of the working medium is expanded, at least one compressor in which the expanded portion of the working medium is again brought to a higher pressure, means controlled automatically in dependency on the load on the plant, which, on a change in load taking place, permit of working medium being withdrawn from or supplied to the circuit at a point where a high pressure prevails, and means for imparting to said automatically controlled means a restoring movement in dependency on the change in the highest pressure occurring in the circuit and under the counter action of the change in the lowest pressure existing within the circuit.

FRITZ SALZMANN.